US008937527B2

(12) United States Patent
Lambrou et al.

(10) Patent No.: US 8,937,527 B2
(45) Date of Patent: Jan. 20, 2015

(54) ELECTRONIC ACCESS SYSTEM

(75) Inventors: Harris Lambrou, Victoria (AU); Sajan K. Velandi, Victoria (AU); Stuart Clark, Victoria (AU); Alan Roy Wilton, Victoria (AU); Ian Bartos, Victoria (AU)

(73) Assignee: Gainsborough Hardware Industries Limited, Blackburn, Victoria (AU)

( * ) Notice: Subject to any disclaimer, the term of this patent is extended or adjusted under 35 U.S.C. 154(b) by 614 days.

(21) Appl. No.: 12/740,343

(22) PCT Filed: Oct. 28, 2008

(86) PCT No.: PCT/AU2008/001592

§ 371 (c)(1),
(2), (4) Date: Sep. 9, 2010

(87) PCT Pub. No.: WO2009/055842

PCT Pub. Date: May 7, 2009

(65) Prior Publication Data

US 2011/0006879 A1 Jan. 13, 2011

(30) Foreign Application Priority Data

Nov. 1, 2007 (AU) ................................ 2007906011

(51) Int. Cl.
*B60R 25/00* (2013.01)
*G07C 9/00* (2006.01)
*G08B 25/00* (2006.01)

(52) U.S. Cl.
CPC .......... *G07C 9/00309* (2013.01); *G08B 25/008* (2013.01); *G07C 2009/00928* (2013.01); *G07C 2209/04* (2013.01); *G07C 2209/62* (2013.01)
USPC .......... 340/5.7; 340/5.2; 340/5.21; 340/12.22

(58) Field of Classification Search
CPC ................. G07C 9/00309; G07C 2009/00793; G07C 9/00182; G08C 17/02; B60R 25/24
USPC ......... 340/10.1, 10.5, 10.51, 572.1, 5.1–5.26, 340/5.3–5.33, 5.6, 5.7, 12.22, 13.24, 13.25, 340/13.26
See application file for complete search history.

(56) References Cited

U.S. PATENT DOCUMENTS 5,650,774 A 7/1997 Drori ....................... 340/825.32
6,243,022 B1 6/2001 Furukawa ................ 340/825.72

(Continued)

OTHER PUBLICATIONS

Garfinkel, Simson, et al. "RFID—Applications, Security, and Privacy", Pearson Education, New Jersey, Jul. 21, 2005, ISBN: 0321290968, p. 20.

*Primary Examiner* — Brian Zimmerman
*Assistant Examiner* — Laura Nguyen
(74) *Attorney, Agent, or Firm* — Ladas & Parry, LLP

(57) ABSTRACT

Methods and systems are described herein for remotely or wirelessly controlling access to dwellings, buildings and/or properties. In one aspect, an electronic access system comprises: a plurality of independent access control devices (115, 125, 135, 145, 155, 165) for controlling entry and/or exit at respective access points and at least one remote control device (170) adapted to wirelessly transmit control signals to the access control devices (115, 125, 135, 145, 155, 165) and wirelessly receive feedback signals from the access control devices. The at least one remote control device (170) is adapted to indicate status information based on receipt of the feedback signals. The plurality of access control devices (115, 125, 135, 145, 155, 165) may be adapted to operate mechanical, electrical or electro-mechanical devices for enabling and/or disabling access in response to receipt of a wireless control signal.

15 Claims, 5 Drawing Sheets

(56) References Cited

U.S. PATENT DOCUMENTS

| | | | | |
|---|---|---|---|---|
| 7,167,083 | B2 | 1/2007 | Giles | 340/426.15 |
| 2003/0006879 | A1* | 1/2003 | Kang et al. | 340/5.61 |
| 2004/0160305 | A1* | 8/2004 | Remenih et al. | 340/5.22 |
| 2005/0258934 | A1* | 11/2005 | Buck et al. | 340/5.23 |
| 2006/0111053 | A1 | 5/2006 | Wu | 455/90.3 |
| 2006/0131412 | A1 | 6/2006 | O'Brien | 235/382 |
| 2006/0220806 | A1* | 10/2006 | Nguyen | 340/426.36 |
| 2007/0188120 | A1 | 8/2007 | Mullet | 318/280 |
| 2007/0188303 | A1 | 8/2007 | Faro | 340/5.73 |
| 2007/0216516 | A1* | 9/2007 | Ghabra et al. | 340/5.64 |

* cited by examiner

ELECTRONIC ACCESS SYSTEM

RELATED APPLICATIONS

This application is the U.S. National Stage of International Patent Application No. PCT/AU2008/001592 Filed on Oct. 28, 2008, which claims priority to Australian Patent Application No. 2007906011 Filed on Nov. 1, 2007, the disclosures of which is hereby incorporated by reference in its entirety.

TECHNICAL FIELD

The present invention relates generally to electronic access systems and more particularly to remotely operable electronic systems, methods and devices for controlling access of dwellings and other buildings and/or premises.

BACKGROUND

Access control systems are becoming more prevalent as security concerns increasingly pervade modern society. Electronic access systems, particularly those employing proximity cards and proximity card readers, are widely used to control access in commercial buildings or premises. In certain cases, such electronic access systems are integrated with or interfaced to a building management system.

Electronic access systems are also widely used to control access to dwellings or domestic premises. Such electronic access systems are generally limited to remote control operation of gates and garage door operators and activation/deactivation of burglar alarms.

In view of the foregoing, a need continually exists for improved methods, systems and devices for remotely or wirelessly controlling access to dwellings, buildings and/or properties.

SUMMARY

A first aspect of the present invention provides an electronic access system for providing selective access to a building or property, said electronic access system comprising: a plurality of independent access control devices for controlling access to said building or property, each of said access control devices comprising a radio frequency receiver for wirelessly receiving control signals; at least one remote control device adapted to wirelessly transmit control signals to said access control devices and wirelessly receive feedback signals from said access control devices; wherein said at least one remote control device is adapted to indicate status information based on receipt of said feedback signals.

The electronic access system may comprise at least one builder's remote control device and at least one owner's remote control device, and the access control devices may be adapted to cease to operate a respective mechanical, electrical or electro-mechanical device in response to receipt of a wireless control signal from the at least one builder's remote control device after first receipt of a wireless control signal from the at least one owner's remote control device.

Another aspect of the present invention provides a remote control device for use with an electronic access system for providing selective access to a building or property, said remote control device comprising: a wireless transmitter for transmitting control signals to one or more access control devices in said electronic access system; and a radio frequency identification (RFID) reader coupled to said wireless transmitter wherein said remote control device is adapted to: determine presence or otherwise, using said RFID reader, of a radio frequency identification (RFID) tag in response to operation of said remote control device by a user; and transmit a control signal only if said RFID reader detects presence of a valid RFID tag; wherein said remote control device and said RFID tag comprise physically separate devices.

Another aspect of the present invention provides a method performed by an access control device for selectively providing access to a building or property, said method comprising the steps of: enabling access to said building or property in response to receipt by said access control device of a wireless control signal transmitted from a first class of remote control device; and upon first receipt of a wireless control signal by said access control device from a second class of remote control device, said access control device thereafter ceasing to provide access to said building or property in response to receipt of further wireless control signals transmitted by said first class of remote control device.

Another aspect of the present invention provides a method performed by a wireless remote control device for selectively providing access to a building or property. The method comprises the steps of: upon detecting a request for access to said building or property, determining presence or otherwise of a radio frequency identification (RFID) tag located physically separately to said wireless remote control device; and wirelessly transmitting a control signal to a remote access control device only if said RFID tag is present.

Another aspect of the present invention provides a remote control device for use with an electronic access system for providing selective access to a building or property. The remote control device comprises: a wireless transmitter for transmitting control signals to an access control device; a wireless receiver for receiving feedback signals from the access control device; and processing and memory means adapted to determine and store whether the access control device is adapted to wirelessly transmit feedback signals.

Another aspect of the present invention provides an access control device for use with an electronic access system for providing selective access to a building or property. The access control device comprises: a wireless receiver for receiving control signals from a remote control device; a wireless transmitter for transmitting feedback signals to the remote control device; and processing and memory means adapted to determine and store whether the remote control device is adapted to wirelessly receive feedback signals.

BRIEF DESCRIPTION OF THE DRAWINGS

A small number of embodiments are described hereinafter, by way of example only, with reference to the accompanying drawings in which.

DETAILED DESCRIPTION

Figure 1:
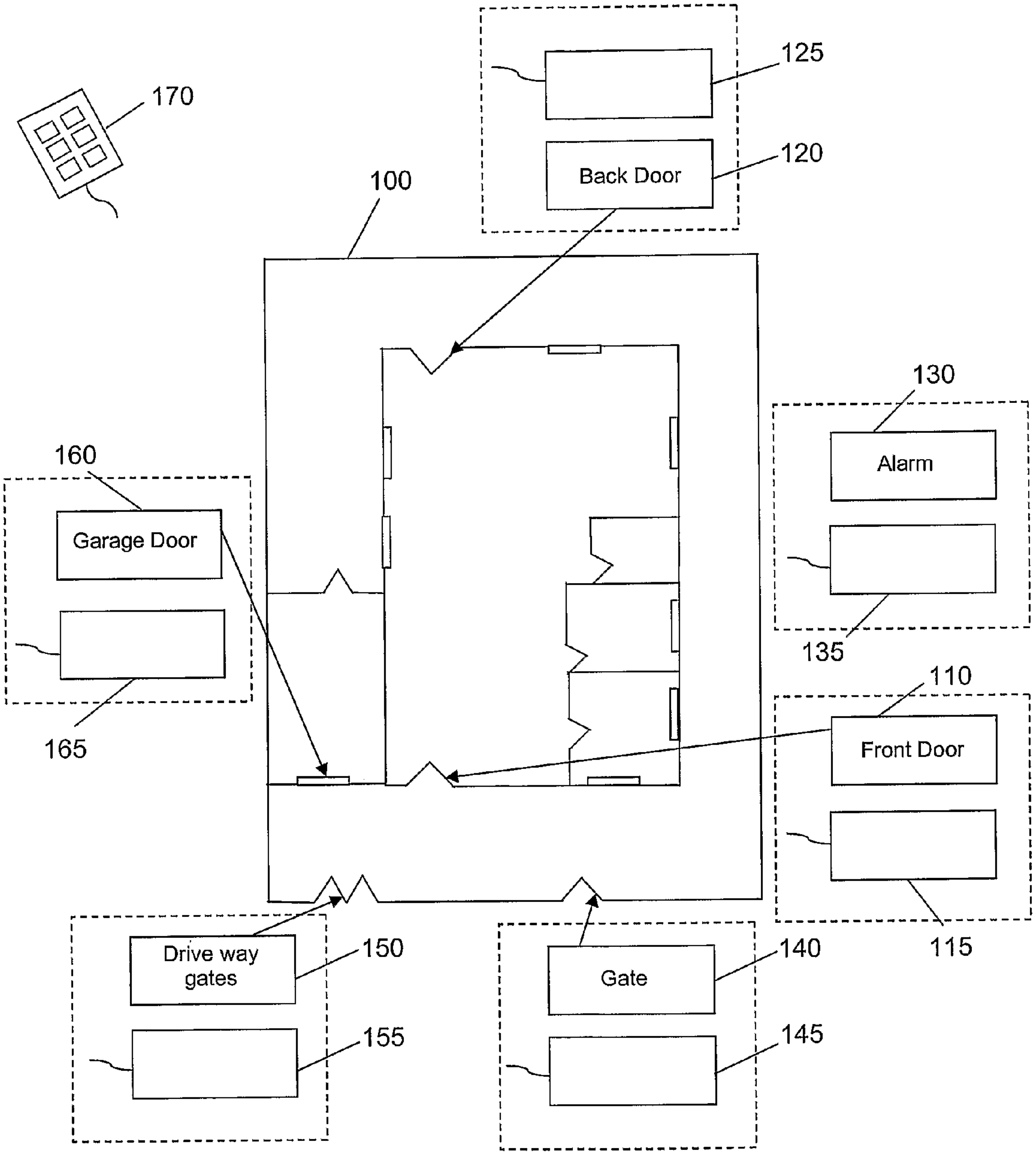
FIG. 1 is a schematic block diagram of an electronic access system applied to a dwelling.

Methods, systems and devices are described hereinafter for remotely or wirelessly controlling access to dwellings, buildings and/or properties.

Embodiments of the present invention include remote control devices for wirelessly controlling one or more access control devices. The access control devices, in turn, control mechanical, electrical or electro-mechanical devices that control access to dwellings, buildings or properties (e.g., electrically operable door lock mechanisms, gate and garage door operators, alarms, etc). The access control devices may be independent of each other, that is, the access control devices need not be to coupled to one another or networked and may operate in a "stand-alone" fashion.

The remote control devices may comprise handheld devices having a number of keys (each representing a control channel) for controlling various functions in an electronic access system. In certain cases, separate keys may be used to initiate wireless transmission of complementary open/close or activate/deactivate control signals. In other cases, successive activations of the same key may be used to initiate control of complementary open/close or activate/deactivate control signals. Certain of the remote control devices may comprise a "function multiplication key" that enables the remaining function keys of the remote control device to have multiple functionalities. For example, pressing or activating the "function multiplication key" just prior to activating a particular function key causes one or more of the function keys to operate different functions compared to if the function keys were activated without first activating the "function multiplication key". In other words, different functions may be accessed by activating the same function key after one or more prior activations of the "function multiplication key", Activation of the "function multiplication key" may automatically time out (and turn off) if a function key is not activated within a selected time duration. The remote control device may also provide visual feedback of activation of the "function multiplication key". For example, a multi-coloured light emitting diode (LED) on the remote control device may glow green if the "function multiplication key" is activated once, red if the "function multiplication key" is activated twice, and yellow if the "function multiplication key" is activated thrice. As is evident from the foregoing description, the "function multiplication key" does not need to be held down while a function key is activated.

In embodiments of the present invention, the remote control devices and/or access control devices may be feedback-enabled for transmitting and/or receiving feedback signals to indicate status information (e.g., successful and/or unsuccessful operation of the access control devices and/or their respective operators or functions). In other words, certain of the remote control devices may be transmitters only, whereas others of the remote control devices may be transceivers and thus capable of wirelessly receiving feedback signals from the access control devices. Similarly, certain of the access control devices may be receivers only, whereas others of the access control devices may be transceivers and thus capable of wirelessly transmitting feedback signals to the remote control devices.

After transmitting a control signal (e.g., in response to a user activating a key), a feedback-enabled remote control device may listen for a feedback signal for a predetermined period (e.g., 30 seconds) from the access control device the control signal was sent to. Feedback status is typically indicated to a user of the remote control device by way of a visual interface (e.g., light emitting diode/s), but may also take other forms such as an audible interface (e.g., a beeper). Furthermore, not all of the access control devices may be capable of wirelessly transmitting feedback signals to the remote control devices. Non-receipt of a feedback signal by a remote control device from a feedback-enabled access control device (error status) may also be indicated to a user of the remote control device.

Certain embodiments described hereinafter refer to or show remote control devices having four or six keys or channels. However, those skilled in the art will appreciate that other numbers of keys or channels are also possible. Furthermore, multiple remote control devices may be practiced to operate the same access control devices and their respective operators or functions. The access control devices may be put in a learn mode, during which time control signals wirelessly transmitted from one or more remote control devices may be learnt to enable the access control devices to uniquely identify a remote control device that a control signal is received from.

As would be well understood by those skilled in the relevant art, the remote control devices and access control devices typically use radio frequency (RF) signals and rolling codes, as opposed to fixed codes, for enhanced security. Embodiments of the present invention may be practiced using off-the-shelf chipsets or integrated circuits to implement the wireless, rolling code transmitters, receivers and/or transceivers. The wireless signals are structured according to a RF protocol, which includes individual channel identification codes to enable differentiation between signals transmitted by different remote control devices and/or in response to activation of different keys on a particular remote control device.

The access control devices may comprise electronically operable door lock mechanisms or electronic controllers that include, or are coupled to, wireless receivers or transceivers. Receivers only are sufficient in cases where access control devices do not provide feedback (i.e., are not feedback-enabled), however, transceivers are required for feedback to be provided. The electronic controllers typically include configurable voltage free contacts (e.g., normally open or normally closed contacts rated for 10A @ 240V) that may be used to control motorized operators and other mechanical, electrical and electromechanical devices. Feedback signals may be provided by sensors such as reed switches for detecting open/closed doors, etc. The is contacts may be configured to operate in a bi-stable fashion (e.g., as a single pole-double throw (SPDT) switch for operating lights, arming/disarming an alarm, etc) or in a mono-stable fashion (e.g., the contacts may be opened or closed for a predetermined period of time such as 1, 5, 10 or 20 seconds in response to receipt of a control signal). Although embodiments of electronic access systems described hereinafter comprise multiple access control devices, an electronic access system having only a single access control device may also be practised.

FIG. 1 shows an electronic access system applied to a dwelling 100. Referring to FIG. 1, independent access control devices 115 and 125 comprise electronically operable door lock mechanisms for controlling entry and/or exit of the front door 110 and back door 120 of the dwelling 100, respectively. Access control devices 115 and 125 are both battery powered, however, access control device 115 includes rechargeable batteries that are charged using a mains-powered transformer and an inductive coupling mechanism for transferring power to the access control device 115. Each of the access control devices 115 and 125 include a radio frequency receiver for wirelessly receiving control signals for operating the respective electronically operable door lock mechanism.

Each of independent access control devices 135, 145, 155 and 165 also include a radio frequency receiver for receiving wireless control signals for controlling respective functions. For example, access control device 135 controls activation and deactivation of a burglar alarm 130. Similarly, independent access control devices 145, 155 and 165 are installed to control operators for a gate 140, driveway gates 150 and a garage door 160, respectively.

A remote control device 170 is adapted to wirelessly transmit control signals to the access control devices 115, 125, 135, 145, 155 and 165. One of the keys on the remote control device 170 may be configured as a shift key, thus enabling dual functionality of each of the remaining five keys. In this manner, a six key remote control device can be made capable of controlling ten independent access control devices (i.e., the shift key enables the remaining five keys to each be used to control two independent functions or access control devices). The remote device 170 is also adapted to wirelessly receive feedback signals from the access control devices 115, 125, 135, 145, 155 and 165. Such feedback signals may be used to indicate status information (e.g., successful and/or unsuccessful operation of the access control devices and their respective operators or functions).

Figure 2:
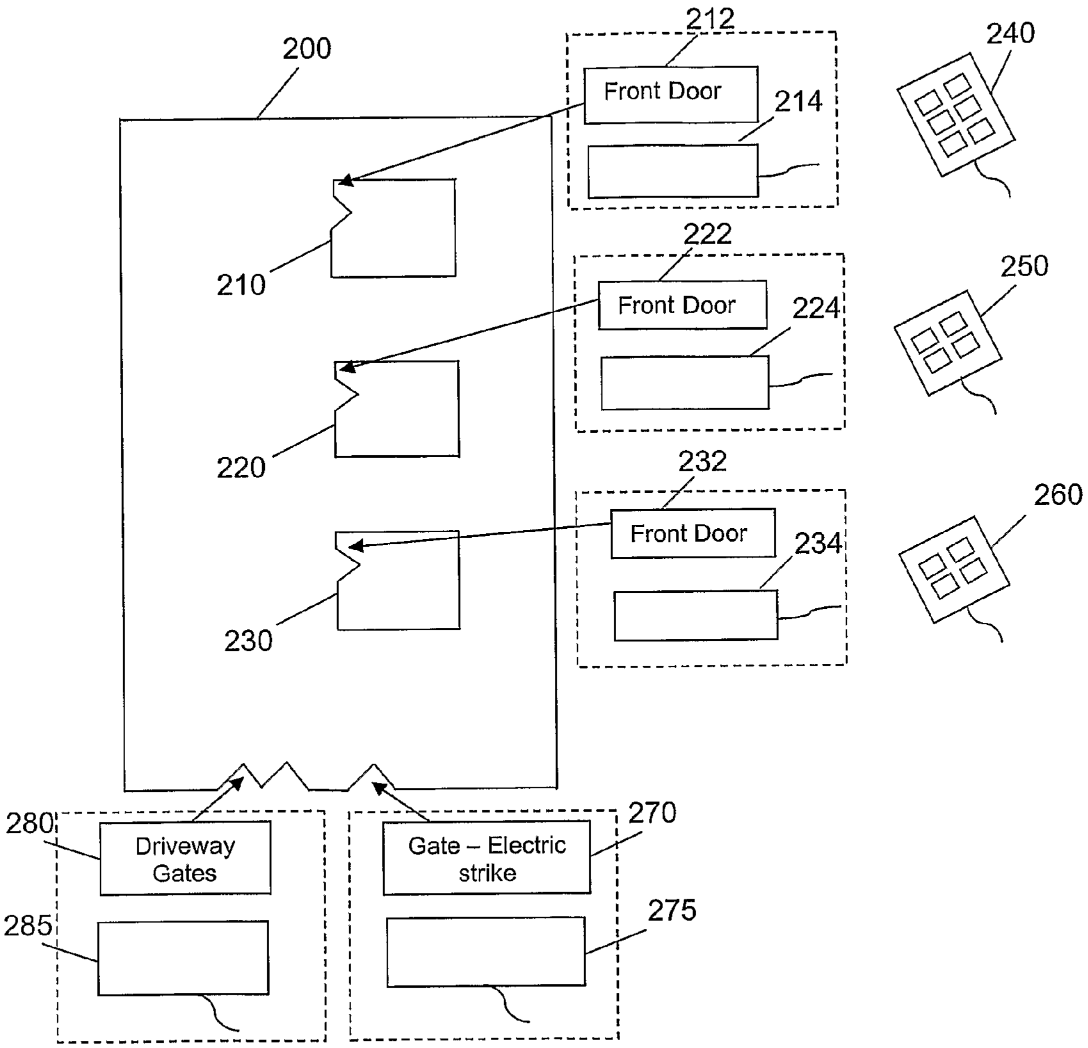
FIG. 2 is a schematic block diagram of an electronic access system applied to a multi-flat dwelling.

FIG. 2 shows an electronic access system applied to a multi-flat dwelling 200. Referring to FIG. 2, each of flats 210, 220 and 230 have a respective independent access control device 214, 224 and 234 for controlling entry and/or exit at front doors 212, 222 and 232, respectively. The independent access control devices 214, 224 and 234 comprise electronically operable door lock mechanisms as described herein before with reference to FIG. 1. Additionally, independent access control devices 275 and 285 are for controlling an electric strike on a gate 270 and an operator to open and close driveway gates 280, respectively.

The remote control device 240 may be used to control the access control devices 214, 275 and 285 to provide access to the front door 212 of the flat 210, the gate 270 and the driveway gates 280, respectively. Similarly, the remote control device 250 may be used to control the access control devices 224, 275 and 285 to provide access at the front door 222 of the flat 220, the gate 270 and the driveway gates 280. Similarly, the remote control device 260 may be used to control the access control devices 234, 275 and 285 to provide access to the front door 232 of flat 230, the gate 270 and the driveways gates 280, respectively. Thus, each of the remote control devices 240, 250 and 260 may be used to control access to the common gate 270 and driveway gates 280. However, access to the front doors 212, 222 and 232 is restricted to a respective remote control device 240, 250 or 260. In order to provide the foregoing access functionality, the access control devices 275 and 285 each learn to recognize a wireless radio signal transmitted when one of the keys of the remote control devices 240, 250 and 260 are activated. The access control device 214 is taught to only recognize a control signal wireless transmitted when one of the keys of the remote control device 240 is activated. Similarly, the access control devices 224 and 234 are taught to only recognize control signals transmitted wirelessly when one of the keys of remote control devices 250 and 260 are activated, respectively. In this way, selective access of the front doors 212, 222 and 232 of the flats 210, 220 and 230, respectively may be achieved.

Figure 3:
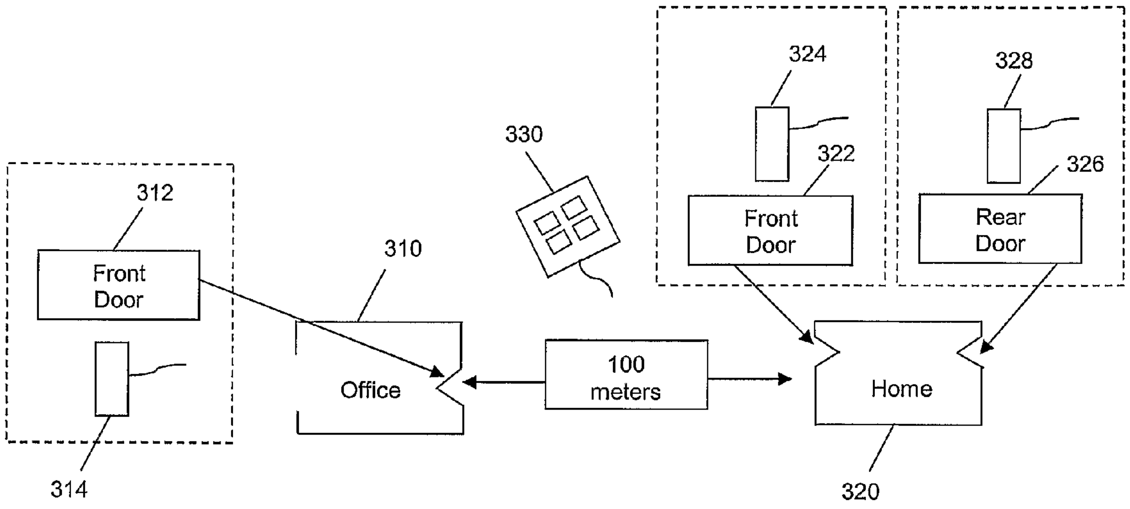
FIG. 3 is a schematic block diagram of an electronic access system installed at separate sites of a particular user.

FIG. 3 shows independent electronic access systems installed at an office site 310 and a home site 320 of a particular user. At the office site, an access control device 314 is used to control access to the front door 312 of the office 310. At the home site 320, an access control device 324 is used to control access to the front door 322 of the home 320 and an access control device 328 is used to control access to a rear door 326 of the home 320.

A common remote control device 330 may be used to access the front door 312 of the office 310 and the front door 322 and the rear door 326 of the home 320. This is accomplished by individually teaching each of the respective access control devices 314, 324 and 328 to recognize a control signal wireless transmitted when a particular key of the remote control device 330 is activated.

The effective wireless transmission range of the remote control device 330 is about 30 m. Thus, if the office site 310 and the home site 320 are separated by more than 100 meters, say, a single key of the remote control device 330 may be used to control individual access control devices at both the office site 310 and the home site 320. For example, a particular key of the remote control device 330 may be used to control the front door access control device 314 at the office 310 and the front door access control device 324 at the home 320. In this scenario, each of the access control devices 314 and 324 would learn to recognize control signals wirelessly transmitted when one particular key on the remote control device 330 is activated.

Figure 4:
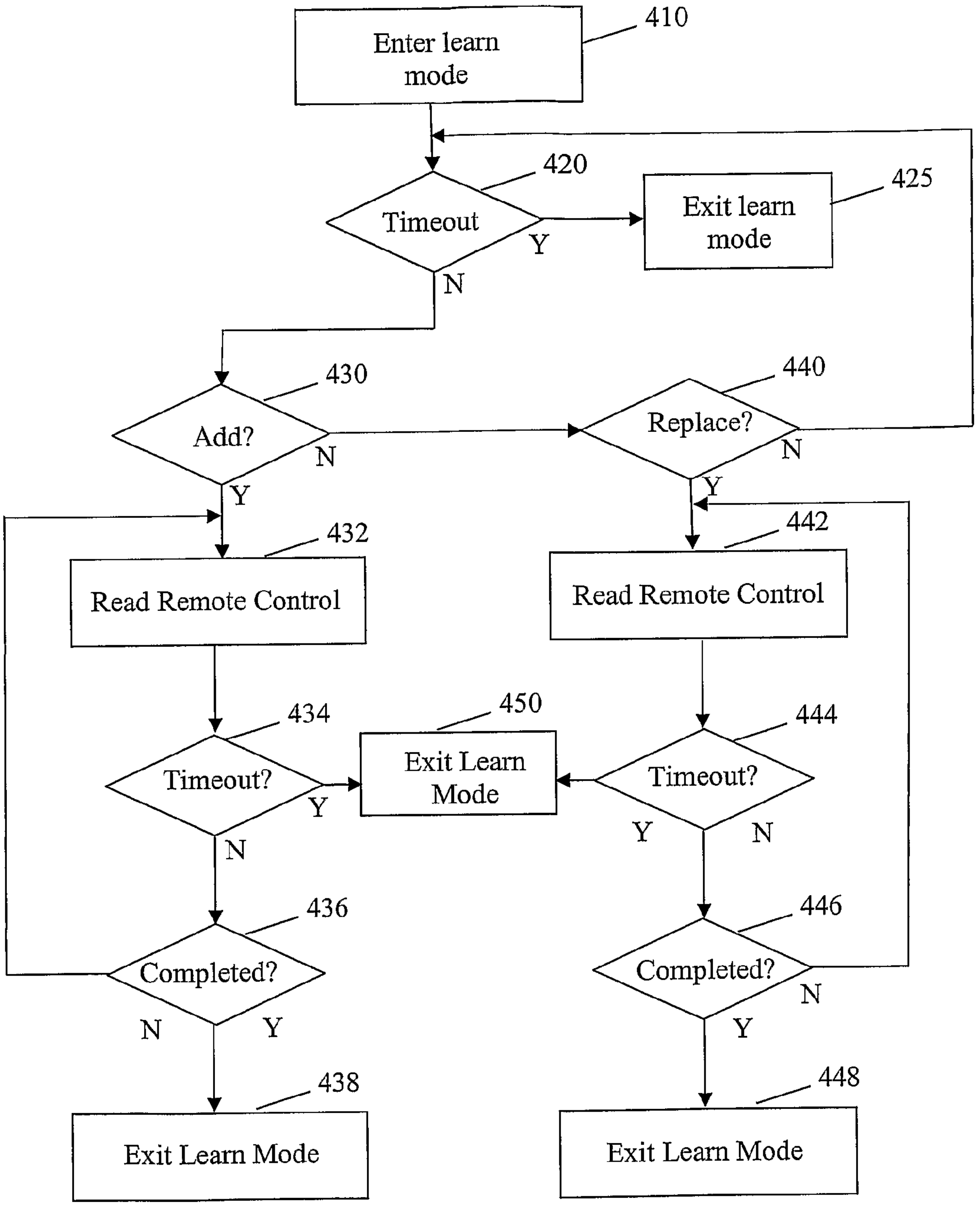
FIG. 4 is a flow diagram of a learning process in which an access control device learns to uniquely identify remote control devices from which control signals are to be wirelessly received.

FIG. 4 is a flow diagram of a learning process in which an access control device learns to uniquely identify remote control devices from which control signals are to be wirelessly received.

Referring to FIG. 4, the access control device enters the learn mode at step 410. Those skilled in the art would appreciate that the learn mode may be activated in numerous different ways. For example, by way of receipt of a ‘learn mode activation’ signal from a remote control device or a computer system interfaced to the access control device, or by a user pressing a key on the access control device. Different learning modes may be activated by receipt of different ‘learn mode activation’ signals. In this manner, access control devices may be restricted to learn only a certain type of remote control device in response to a particular ‘learn mode activation’ signal, thus enabling differentiation between classes of remote control devices.

At step 420, a determination is made whether the learn mode has timed out. If so (Y), the learn mode is exited at step 425. If not (N), a determination is made at step 430 whether a remote control device is to be added. If so (Y), the unique ID of remote control device to be added is read at step 432 (a user is required to activate a key on the remote control device at this juncture for reading/learning) and stored in the memory of the access control device. At step 434, a determination is made whether the add option has timed out. If so (Y) the learn mode is exited at step 450. If not (N) a determination is made at step 436 whether the add option is complete. If not (N) processing returns to step 432 to read another remote control device. If so (Y), the learning mode is exited at step 438.

Returning to step 430, if a remote control device is to be replaced (Y), the unique ID of the replacement remote control device is read at step 442 (a user is required to activate a key on the remote control device at this juncture for reading/learning), the unique ID/s of the remote control device/s currently stored in the memory of the access control device are erased and the unique ID of the newly read remote control device is stored in the memory of the access control device. At step 444, a determination is made whether the replace option has timed out. If so (Y), the learn mode is exited at step 450. If not (N) a determination is made at step 446 whether the replace option is complete. If not (N) processing returns to step 442 to read another remote control device. If so (Y), the learning mode is exited at step 448.

An access control device may determine whether each particular remote control device is feedback-enabled, or not, during the learning process. This information may be stored in the memory of the access control device, thus enabling the access control device to determine whether to wirelessly transmit feedback signals in response to a wirelessly received control signal, or not.

A feature provided in certain embodiments of the present invention is a builder/owner access handover capability. When a completed building or property is handed over to the owner by the builder, it is desirable that the builder be prevented from accessing the building or property thereafter. This access handover capability/feature enables remote control devices of a first class (e.g., a builder's remote control device) to initially operate the access control device/s installed at a particular building or property. However, upon first receipt of a wireless control signal from one of a second class of remote control device (e.g., an owner's remote control device), the access control device/s is/are adapted to thereafter prevent access to the building or property in response to receipt of a wireless control signal transmitted from remote control devices of the first class. In other words, once a wireless control signal is received from an owner's remote control device, the access control device thereafter ceases to recognise or provide access in response to a control signal received from a builder's remote control device.

The identification codes of the builder's remote control device/s may be deleted from the memory of the access control device/s upon first receipt of a control signal from an owner's remote control device.

Figure 5:
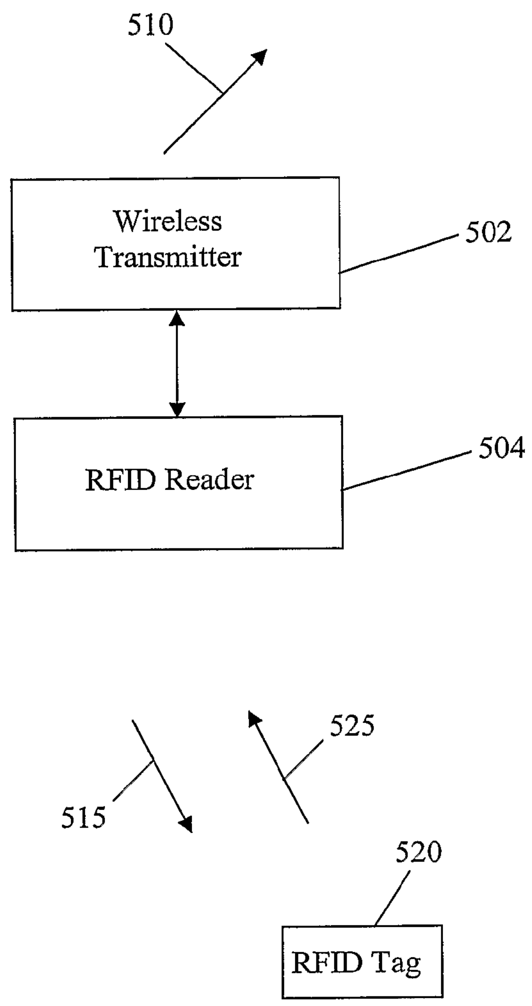
FIG. 5 is a schematic block diagram of a remote control device for use with an electronic access system in accordance with an embodiment of the present invention.

FIG. 5 shows a block diagram of a remote control device for use with an electronic access system in accordance with an embodiment of the present invention. Referring to FIG. 5, the remote control device 500 comprises a wireless transmitter 502 and a radio frequency identification (RFID) reader 504. In certain embodiments, the remote control device 500 may comprise a remote control device such as the remote control devices described hereinbefore with reference to FIGS. 1 to 4) with the radio frequency identification (RFID) reader 504 additionally located within a single housing. However, in other embodiments, the wireless transmitter 502 and the radio frequency identification (RFID) reader 504 may comprise physically separate devices connected by a cable or encrypted radio frequency (RF) link.

In operation, when the remote control device 500 is operated by a user to wirelessly transmit a control signal to a remote access control device, the remote control device 500 firstly detects whether a valid RFID tag 520 is present using the RFID reader 504. The RFID reader 504 emits an energizing or activation signal 515 that powers up or activates the RFID tag 520, if the RFID tag 520 is present (e.g., within a range of 1 m). If present, the RFID tag 520 modifies the activation signal 515 (if the RFID tag is passive) or returns a signal 525 to the RFID reader 504 (if the RFID tag is active). If the RFID tag 520 is present and/or valid, the remote control device 500 wirelessly transmits a control signal 510 to the remote access control device. On the other hand, if an RFID tag 520 is not present and/or is invalid, the remote control device 500 does not wirelessly transmit a control signal 510 to the remote access control device. A 'valid' RFID tag may simply be a tag that provides a valid signal to the RFID reader 504 or a tag that the RFID reader 504 has specifically learnt to recognize.

The arrangement of FIG. 5 provides additional security by requiring qualification from the RFID tag 520 before the remote control device 500 proceeds to wirelessly transmit a control signal to a remote access control device. For example the remote control device 500 may be used to access a dwelling (e.g., a garage door) from within a car. An authorized user would have a valid RFID tag 520 present in the car, possibly attached to the key ring of the key for the car. When the remote control device 500 is activated by the user to operate the garage door, the RFID reader 504 in the remote control device 500 determines whether the RFID tag 520 is present or not before wirelessly transmitting a control signal to the remote access control device. In this way, a remote control device 500 left in a car cannot be used in the absence of the RFID tag 520.

The RFID reader 504 may learn additional or replacement RFID tags in a manner similar to that described hereinbefore with reference to access control devices learning remote control devices.

As described hereinbefore, the remote control devices and access control devices of embodiments of the present invention may be feedback-enabled for receiving and transmitting, respectively, feedback signals to indicate status information (e.g., successful and/or unsuccessful operation of the access control devices and/or their respective operators or functions) in response to a control signal.

In certain embodiments, the access control devices determine and store whether the remote control devices are feedback-enabled (for example, while an access control device is learning the unique ID of a particular remote control device). This enables an access control device to only provide feedback signals to a remote control device that the access control device knows to be feedback-enabled. Accordingly, a feedback-enabled remote control device can indicate status information (e.g., successful and/or unsuccessful operation of the access control device) based on a feedback signal received from an access control device. However, a feedback-enabled remote control device is unable to indicate an error if a feedback signal is not received from an access control device within a predetermined time (e.g., 30 seconds) after transmission of a control signal by the remote control device as the remote control device is unable to differentiate between a feedback-enabled access control device and a non-feedback-enabled access control device.

In other embodiments, the remote control devices may determine and store whether access control devices are feedback-enabled (for example, while an access control device is learning the unique ID of a particular remote control device). This enables a remote control device to only listen for feedback signals from access control devices that the remote control device knows to be feedback-enabled—feedback signals from access control devices that the remote control device knows not to be feedback-enabled are not listened for. Accordingly, a feedback-enabled remote control device can indicate an error if no feedback signal is received from a feedback-enabled access control device within a predetermined time (e.g., 30 seconds) after transmission of a control signal by the remote control device.

Non-feedback-enabled remote control devices do not listen for feedback from either feedback-enabled or non-feedback-enabled access control devices.

In certain embodiments, both access control devices and remote control devices may determine and store whether the other are feedback-enabled.

The feedback-enabled access control devices and remote control devices described hereinbefore comprise wireless transmitters and receivers for wirelessly transmitting and receiving control signals and feedback signals and processing and memory means (e.g., a processor and internal or external memory, or a state machine and memory) for determining and storing whether other devices are adapted to wirelessly transmit and/or receive feedback signals.

In certain embodiments, a different type of remote control device may be provided that enables external or third party devices or systems (e.g., a home automation system) to control access control devices of the present invention. In this instance, the keys of the remote control device are replaced by contactors and the visual feedback indicators (e.g., LEDs) are replaced by relays or solid state switches. This enables an external control device to activate the contactors and receive feedback signals from the relay or solid state switch contacts without the need for human operation or intervention.

A Building Database Box or Maison Box may be used under the control of a software program running on a computer system (e.g., a personal computer system) to add or delete remote control devices or to reassign remote control devices to alternate access control devices, without the remote control devices actually being present. The software program and/or Building Database Box maintain/s a list of access control devices in the electronic access system and remote control devices that have been learnt by the respective access control devices. The list may comprise a matrix showing which remote control devices have been learnt by which access control devices.

The foregoing description provides exemplary embodiments only, and is not intended to limit the scope, applicability or configurations of the present invention. Rather, the description of the exemplary embodiments provides those skilled in the art with enabling descriptions for implementing an embodiment of the invention. Various changes may be made in the function and arrangement of elements without departing from the spirit and scope of the invention as set forth in the claims hereinafter.

Where specific features, elements and steps referred to herein have known equivalents in the art to which the invention relates, such known equivalents are deemed to be incorporated herein as if individually set forth. Furthermore, features, elements and steps referred to in respect of particular embodiments may optionally form part of any of the other embodiments unless stated to the contrary.

[Australia Only]

The term “comprising”, as used herein, is intended to have an open-ended, non-exclusive meaning. For example, the term is intended to mean: “including principally, but not necessarily solely” and not to mean “consisting essentially of” or “consisting is only of”. Variations of the term “comprising”, such as “comprise”, “comprises” and “is comprised of”, have corresponding meanings.

The invention claimed is:

1. An electronic access system for providing selective access to a building or property, said electronic access system comprising:

- a plurality of independent access control devices for controlling access to said building or property, each of said access control devices comprising a radio frequency receiver for wirelessly receiving control signals;
- at least one remote control device adapted to wirelessly transmit control signals to said access control devices and wirelessly receive feedback signals from said access control devices; and
- at least one first class remote control device and at least one second class remote control device;
- wherein said plurality of access control devices are adapted to permanently cease to operate a respective mechanical, electrical or electro-mechanical device in response to receipt of a wireless control signal from said at least one first class remote control device after first receipt of a wireless control signal from said at least one second class remote control device but not to disable access in response to the at least one second class remote control device;
- wherein said at least one remote control device is adapted to indicate status information of said access control devices based on receipt of said feedback signals; and
- wherein said remote control device is adapted to:
  - determine presence or absence, using said RFID reader, of a radio frequency identification (RFID) tag in response to operation of said remote control device by a user; and
  - transmit a control signal only if said RFID reader detects presence of a valid RFID tag;
    - wherein said remote control device and said RFID tag comprise physically separate devices.

2. The electronic access system of claim 1, wherein said plurality of access control devices are adapted to operate a mechanical, electrical or electro-mechanical device for enabling and/or disabling access in response to receipt of a wireless control signal.

3. The electronic access system of claim 2, wherein at least one of said plurality of access control devices is adapted to wirelessly transmit a feedback signal indicative of operation of said mechanical, electrical or electro-mechanical device.

4. The electronic access system of claim 3, wherein said at least one remote control device is adapted to visually indicate successful and/or unsuccessful operation of said mechanical, electrical or electro-mechanical device.

5. The electronic access system of claim 4, comprising at least two of said remote control devices and wherein at least one of said plurality of access control devices is adapted to operate said mechanical, electrical or electro-mechanical device in response to wireless receipt of a control signal from any one of said at least two remote control devices.

6. The electronic access system of claim 1, wherein at least one of said plurality of access control devices is integrated with an electronically operable door lock mechanism and is adapted to operate said electronically operable door lock mechanism in response to receipt of a wireless control signal.

7. The electronic access system of claim 1, wherein said plurality of access control devices are adapted to enter a learning mode when said learning mode is activated, whereby said plurality of access control devices learn one or more remote control devices such that said plurality of access control devices can uniquely identify a remote control device from which a control signal is wirelessly received.

8. The electronic access system of claim 1, wherein at least one access control device is adapted to determine and store whether said at least one remote control device is adapted to wirelessly receive feedback signals.

9. The electronic access system of claim 1 or claim 8, wherein said at least one remote control device is adapted to determine and store whether said access control devices are adapted to wirelessly transmit feedback signals.

10. A method performed by a wireless remote control device for selectively providing access to a building or property via an electronic access system of claim 1, said method comprising the steps of:

- upon detecting a request for access to said building or property, determining presence or absence of a radio frequency identification (RFID) tag located physically separately to said wireless remote control device;
- wirelessly transmitting a control signal to a remote access control device only if said RFID tag is present;
- wirelessly receiving a feedback signal from said access control device; and
- indicating status information of said access control device based on receipt of said feedback signal.

11. The electronic access system of claim 1, wherein:

said at least one remote control device comprises at least one function key and a function multiplication key; and activation of said function multiplication key one or more times prior to activation of a function key on said at least one remote control device causes said function key to operate different functions.

12. A remote control device for use with an electronic access system for providing selective access to a building or property, said remote control device comprising:

a wireless transmitter for transmitting control signals to a plurality of access control devices in said electronic access system; and a radio frequency identification (RFID) reader coupled to said wireless transmitter;

a receiver for wirelessly receiving feedback signals from said access control devices; and at least one first class remote control device and at least one second class remote control device;

wherein said plurality of access control devices are adapted to permanently cease to operate a respective mechanical, electrical or electro-mechanical device in response to receipt of a wireless control signal from said at least one first class remote control device after first receipt of a wireless control signal from said at least one second class remote control device but not to disable access in response to the at least one second class remote control device;

wherein said remote control device is adapted to indicate status information of said access control devices based on receipt of said feedback signals; and wherein said remote control device is adapted to:

determine presence or absence, using said RFID reader, of a radio frequency identification (RFID) tag in response to operation of said remote control device by a user; and transmit a control signal only if said RFID reader detects presence of a valid RFID tag;

wherein said remote control device and said RFID tag comprise physically separate devices.

13. A remote control device for use with an electronic access system for providing selective access to a building or property, said remote control device comprising:

a wireless transmitter for transmitting control signals to a plurality of access control devices;

a wireless receiver for receiving feedback signals from said access control devices;

processing and memory means adapted to determine and store whether said access control devices are adapted to wirelessly transmit feedback signals; and at least one first class remote control device and at least one second class remote control device;

wherein said plurality of access control devices are adapted to permanently cease to operate a respective mechanical, electrical or electro-mechanical device in response to receipt of a wireless control signal from said at least one first class remote control device after first receipt of a wireless control signal from said at least one second class remote control device but not to disable access in response to the at least one second class remote control device;

wherein said remote control device is adapted to indicate status information of said access control devices based on receipt of said feedback signals; and wherein said remote control device is adapted to:

determine presence or absence, using said RFID reader, of a radio frequency identification (RFID) tag in response to operation of said remote control device by a user; and transmit a control signal only if said RFID reader detects presence of a valid RFID tag;

wherein said remote control device and said RFID tag comprise physically separate devices.

14. An access control system for use with an electronic access system for providing selective access to a building or property, said access control system comprises a plurality of access control devices, each of which comprising:

a wireless receiver for receiving control signals from a remote control device comprising at least one first class remote control device and at least one second class remote control device;

wherein said plurality of access control devices are adapted to permanently cease to operate a respective mechanical, electrical or electro-mechanical device in response to receipt of a wireless control signal from said at least one first class remote control device after first receipt of a wireless control signal from said at least one second class remote control device but not to disable access in response to the at least one second class remote control device;

a wireless transmitter for transmitting feedback signals to said remote control device; and processing and memory means adapted to determine and store whether said remote control device is adapted to wirelessly receive feedback signals;

wherein said feedback signals provide information about the status of said access control device; and wherein said remote control device is adapted to:

determine presence or absence, using said RFID reader, of a radio frequency identification (RFID) tag in response to operation of said remote control device by a user; and transmit a control signal only if said RFID reader detects presence of a valid RFID tag;

wherein said remote control device and said RFID tag comprise physically separate devices.

15. The access control device of claim 14, comprising at least one function key and a function multiplication key;

wherein activation of said function multiplication key one or more times prior to activation of a function key on said at least one remote control device causes said function key to operate different functions.

* * * * *